(12) United States Patent
Saito et al.

(10) Patent No.: US 8,300,526 B2
(45) Date of Patent: Oct. 30, 2012

(54) NETWORK RELAY APPARATUS AND PACKET DISTRIBUTION METHOD

(75) Inventors: Shinichiro Saito, Kawasaki (JP); Xiping Lin, Yokohama (JP); Haruo Yamashita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 369 days.

(21) Appl. No.: 12/627,380

(22) Filed: Nov. 30, 2009

(65) Prior Publication Data

US 2010/0172348 A1 Jul. 8, 2010

(30) Foreign Application Priority Data

Jan. 7, 2009 (JP) .................................. 2009-001576

(51) Int. Cl.
*H04L 12/26* (2006.01)
(52) U.S. Cl. ..................... 370/230; 370/395.32; 370/413
(58) Field of Classification Search ........................ None
See application file for complete search history.

(56) References Cited

U.S. PATENT DOCUMENTS

| | | | |
|---|---|---|---|
| 6,963,578 B2 * | 11/2005 | Akahane et al. | 370/417 |
| 7,215,637 B1 * | 5/2007 | Ferguson et al. | 370/230.1 |
| 7,397,762 B1 * | 7/2008 | Firoiu et al. | 370/230 |
| 7,596,621 B1 * | 9/2009 | Knee et al. | 709/230 |
| 7,688,838 B1 * | 3/2010 | Aloni et al. | 370/412 |
| 2002/0027917 A1 | 3/2002 | Sugai et al. | |
| 2003/0002438 A1 | 1/2003 | Yazaki et al. | |
| 2004/0136368 A1 | 7/2004 | Wakayama et al. | |
| 2008/0101233 A1 * | 5/2008 | Shi et al. | 370/235 |
| 2008/0101354 A1 * | 5/2008 | Arndt | 370/389 |
| 2009/0028045 A1 * | 1/2009 | Stellenberg et al. | 370/230 |
| 2011/0096664 A1 * | 4/2011 | Petry et al. | 370/231 |

FOREIGN PATENT DOCUMENTS

| | | |
|---|---|---|
| JP | 2001-211203 A | 8/2001 |
| JP | 2003-018198 A | 1/2003 |
| JP | 2004-221805 A | 8/2004 |
| JP | 2008-167305 A | 7/2008 |

* cited by examiner

*Primary Examiner* — Michael J Moore, Jr.
(74) *Attorney, Agent, or Firm* — McDermott Will & Emery LLP

(57) ABSTRACT

The present invention provides a network relay apparatus capable of assuring the prevention of occurrence of order reversion of packets within flows and shifting a packet distribution destination according to load information. The network relay apparatus includes: a packet distribution processor for distributing input packets to thereby achieve load dispersion of packet processing; a statistical information collector for regularly collecting load conditions of respective packet processors; and a distribution information holder for retaining information for specifying the packet distribution destinations upon distribution of the packets. Information about the load conditions of the respective packet processors are compiled and distributed to the packet processor smallest in load. Timing provided to change the packet distribution destination is assumed to be given when a processing waiting queue does not include a packet corresponding to its flow.

5 Claims, 11 Drawing Sheets

FIG.4

| HASH VALUE | DISTRIBUTION DESTINATION PACKET PROCESSOR | REFERENCE COUNTER |
|---|---|---|
| 1 | #2 | 2 |
| 2 | #1 | 0 |
| ⋮ | ⋮ | ⋮ |
| 2578 | #2 | 4 |
| 2579 | – | 0 |
| 2580 | #N | 1 |
| ⋮ | ⋮ | ⋮ |
| M−1 | – | 0 |
| M | #3 | 2 |

| # | PACKET PROCESSOR |
|---|---|
| 1 | #2 |
| 2 | #1 |
| ⋮ | ⋮ |
| N−1 | #N |
| N | #3 |

301, 302, 300

LOAD: LIGHT (top) → HEAVY (bottom)

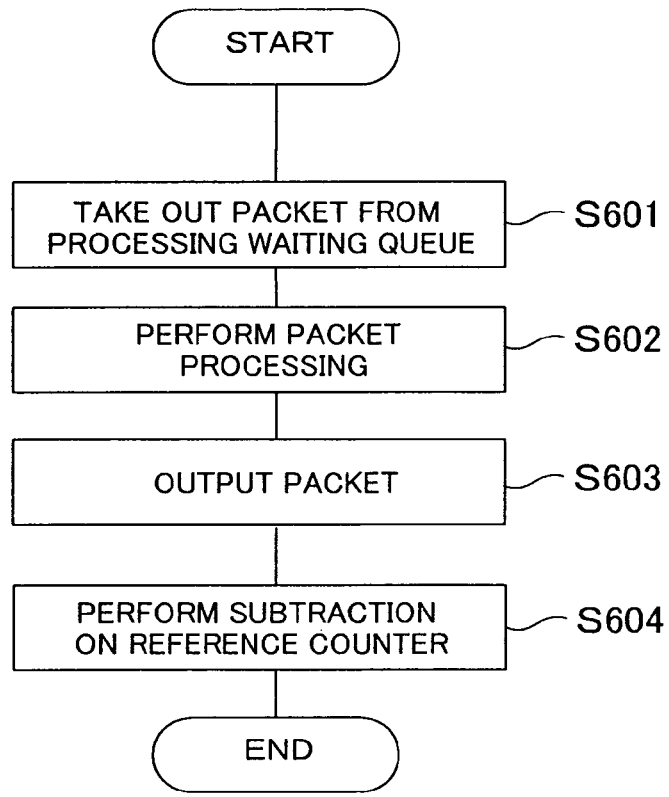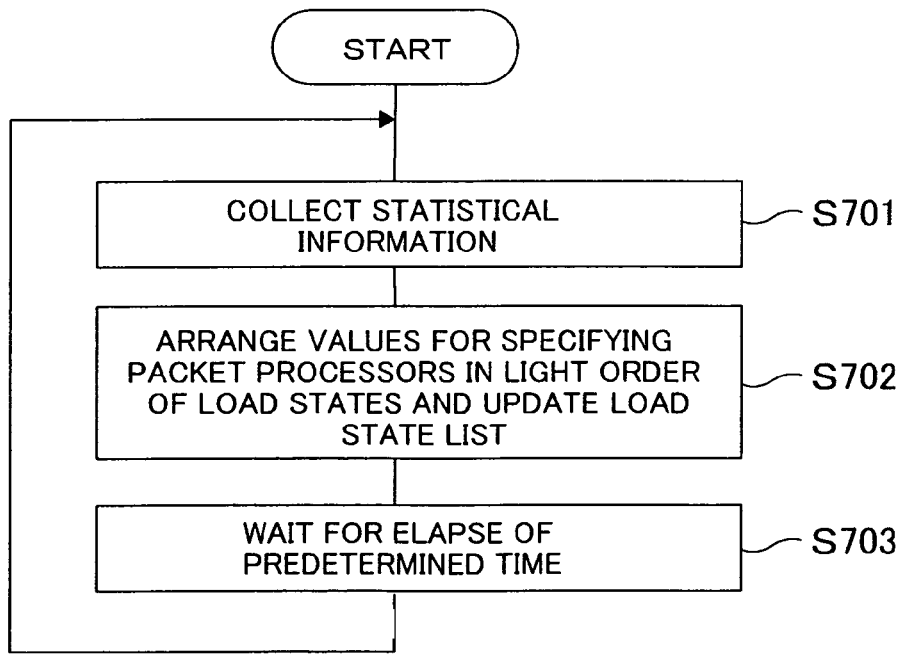

NETWORK RELAY APPARATUS AND PACKET DISTRIBUTION METHOD

CLAIM OF PRIORITY

The present application claims priority from Japanese patent application serial no. 2009-001576, filed on Jan. 7, 2009, the content of which is hereby incorporated by reference into this application.

BACKGROUND OF THE INVENTION

The present invention relates to a network relay apparatus and a packet distribution method, and particularly to a network relay apparatus and a packet distribution method that distribute input packets to a plurality of packet processors to thereby process the same in parallel and transfer the packets at high speed.

With greater sophistication of communication services using the Internet, such as video distribution, the sharing of data using P2P (Peer to Peer), etc., an increase in the amount of traffic has been abruptly advanced in recent years. An increase in communication speed has been required more than before. The processing load of a network relay apparatus such as a router, a gateway or the like in a network is becoming larger. An improvement in the throughput of the network relay apparatus is therefore urgently necessary.

Examples of techniques for improving packet throughput using a network relay apparatus include a parallel processing technique. The parallel processing technique executes processes such that a plurality of packet processors and a packet distribution unit provided in a stage prior to these are provided and packets are distributed to the packet processors to perform parallel processing thereof, thereby improving the packet throughput of the whole apparatus.

A round robin method is known as a first method for realizing the distribution of packets. The round robin method performs distributing packets in their arrival order. This method may vary in throughput speed depending on the length of each packet or the processing contents thereof. The method is therefore accompanied by a problem that the processing load cannot be dispersed uniformly.

There is thus provided an out-of-order method as a second method. The out-of-order method performs distributing each packet to a vacant packet processor. While uniform load distribution is performed in this method, among a series of packets continuously sent from a packet transfer source to a packet transfer destination, a packet having passed through a packet processor low in processing load may overtake a packet having passed through a packet processor high in processing load, inclusive of the round robin method, thereby reversing the order of the packets.

There is therefore provided a hash method as a third method. The hash method performs distributing packets in accordance with hash values calculated on the basis of header information. This is, for example, a method for calculating a hash function assuming, as an argument, a set of a source IP address of a packet, a destination IP address thereof, a protocol number thereof and the like taken as header information indicative of a flow, and determining a packet's distribution destination in accordance with the thus-obtained value (hash value). According to the present method, the order of each packet lying within the same flow is assured.

Japanese Patent Laid-Open Publication No. 2001-211203 provides the three methods referred to above. Upon dispersing the load using each of the round robin method and the out-of-order method, a transfer packet rearrangement processor is provided at an output stage to prevent the reversal of order of each packet, thereby rearranging the packets to the order at which the packet has been distributed and outputting them.

Japanese Patent Laid-Open Publication No. 2008-167305 has disclosed packet processing at a network apparatus. The patent document 2 discloses load dispersion by parallel processing at the network apparatus, but does not assure the prevention of the reversal of order of each packet.

Japanese Patent Laid-Open Publication No. 2004-221805 has disclosed load dispersion at a packet communication processor. The load dispersion described in Japanese Patent Laid-Open Publication No. 2004-221805 is based on statistical information. Japanese Patent Laid-Open Publication No. 2004-221805, however, does not assure the prevention of the reversal of order of each packet.

Japanese Patent Laid-Open Publication No. 2003-018198 has disclosed a packet transfer apparatus. The packet transfer apparatus however relates merely to parallelization of header processing.

A packet distribution method using a hash method will be explained with reference to FIGS. 1A and 1B. Here, FIGS. 1A and 1B are block diagrams for describing the packet distribution method using the hash method. In FIGS. 1A and 1B, only two packet processors 105 are described for the simplification of illustration. Only a packet distribution processor 103, processing waiting queues 104 and packet processors 105 in a network relay apparatus are shown in extracted form. Packets shown in circular form will be explained with reference to a processing waiting queue 104-1 of FIG. 1A. Packets A1, C1, A2 and C2 are being retained in the processing waiting queue 104-1 in this order. A means a flow A and C means a flow C. Numbers subsequent to A or C indicate flow's sequence numbers. Each processing waiting queue 104 is a so-called FIFO (First In First Out) memory, which inputs each packet from the left and outputs the same from the right.

In FIG. 1, the packet distribution processor 103 determines a hash value on the basis of header information of each received packet. The packet distribution processor 103 further specifies each of distribution destination packet processors 105-1 and 105-2 from the corresponding hash value. Here, packets that belong to the flows A and C are distributed to the processing waiting queue 104-1, and packets that belong to flows B are distributed to a processing waiting queue 104-2.

FIG. 1B shows the manner in which the time elapses slightly as compared with FIG. 1A and the traffic of each flow A increases. In the hash method, once-distributed packets continue to be processed by the same packet processor 105-1, but are not processed by the other packet processor 105-2. Therefore, the packet processor 105-2 does not process a flow C even though it is relatively light in load. There is thus a possibility that the flow C will be delayed and lose each packet due to the influence of each flow A.

SUMMARY OF THE INVENTION

A problem arises in that the reversal of order of packets occurs upon simple implementation in the round robin method or the out-of-order method. Although this problem can also be avoided by providing the transfer packet rearrangement processor at the output stage as described above, this processing causes a delay time and increases the cost of implementation since this problem is solved by applying sequence numbers to internal headers applied to packets respectively upon packet reception and rearranging the order of the sequence numbers upon packet transmission, followed by transmission of each packet.

On the other hand, in the hash method, the packets in the same flow are distributed to the same packet processor according to the generated hash values. Therefore, the order reversal in the flows does not occur in the hash method. There is, however, a potential for the packets to concentrate on the specific packet processor such that the distribution destination packet processors determined from the hash values at the plural flows become identical. In this case, vacant packet processors cannot be utilized effectively.

The present invention has been made in view of the foregoing problems. The present invention provides a packet distribution method capable of assuring avoiding the occurrence of the reversal of order of packets in a flow without the need for a special packet rearrangement processor and capable of shifting a packet distribution destination according to a load condition, and a network relay apparatus having a plurality of packet processors and capable of processing packets in parallel by the packet distribution method.

The above problem can be solved by a network relay apparatus comprising a receive queue, a packet distribution processor for taking out packets from the receive queue, a plurality of processing waiting queues, a plurality of packet processors corresponding to the processing waiting queues, a transmit queue, the network relay apparatus further comprising: a statistical information collector for regularly collecting load states of the packet processors; and a distribution information holder for holding the load states collected by the statistical information collector and a distribution information table in which hash values, packet processors and counters are associated with one another. In the network relay apparatus, after the packet distribution processor has transmitted packets to the processing waiting queues, the packet distribution processor increments a counter for a corresponding hash value in the distribution information table, and after each of the packet processors has transmitted a packet to the transmit queue, the packet processor decrements a counter for a corresponding hash value in the distribution information table. Further, in the network relay apparatus, when a packet is acquired from the receive queue, the packet distribution processor refers to a counter for a corresponding hash value in the distribution information table and updates a packet processor for the corresponding hash value in the distribution information table when the value of the counter is a predetermined value.

The above Problem can also be solved by a network relay apparatus comprising: a packet distribution processor for distributing input packets, based on hash values to thereby achieve load dispersion of packet processing; a statistical information collector for regularly collecting load states of respective packet processors used to specify packet distribution destinations; a distribution information holder for managing information for specifying the packet distribution destinations upon distribution of the packets; and a plurality of the packet processors for processing the distributed packets. In the network relay apparatus, the distribution information holder has a distribution information table in which hash values, packet processors and counters are associated with one another, the packet distribution processor increments a counter for a corresponding hash value in the distribution information table after completion of the packet processing, and each of the packet processors decrements a counter for a corresponding hash value in the distribution information table after completion of the packet processing.

Further, the above problem can be solved by a packet distribution method comprising the steps of: taking out each packet from a receive queue; calculating a hash value of the packet; referring to a distribution information table, based on the hash value; confirming whether a counter value of the distribution information table is a predetermined value; distributing the packet to a processing waiting queue; incrementing the counter value; taking out the packet from the processing waiting queue; outputting the packet, and decrementing the counter value.

According to the present invention, a packet relay apparatus is capable of dynamically changing distribution destinations of packets every flow according to actual traffic conditions.

BRIEF DESCRIPTION OF THE DRAWINGS

FIG. 4 is a diagram for describing a distribution information table;

FIG. 5 is a diagram for describing a load state list;

FIG. 8 is an operation flowchart of a packet processor;

FIG. 9 is a flowchart showing the operation of a statistical information collector;

DESCRIPTION OF THE EMBODIMENTS

Figure 1A:
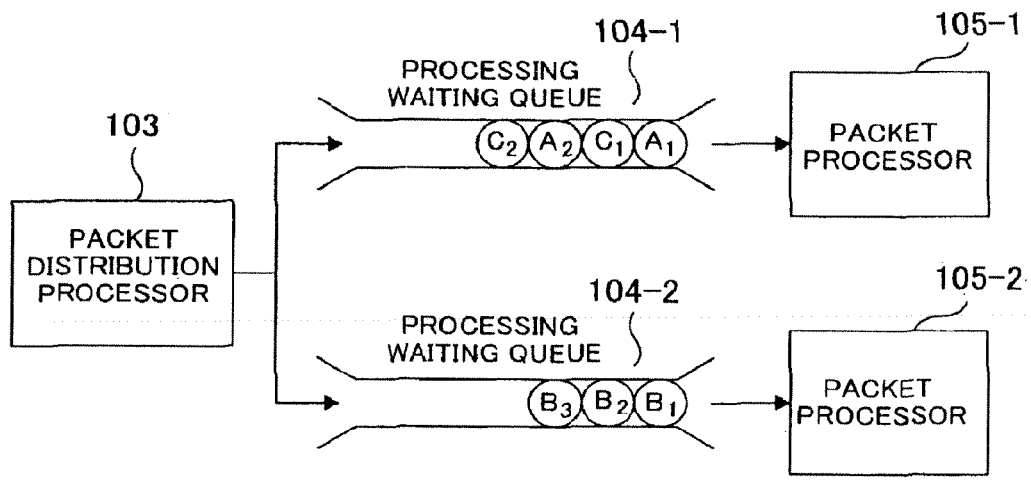
FIG. 1A is a block diagram for describing a packet distribution method using a hash method (part 1)
Figure 1B:
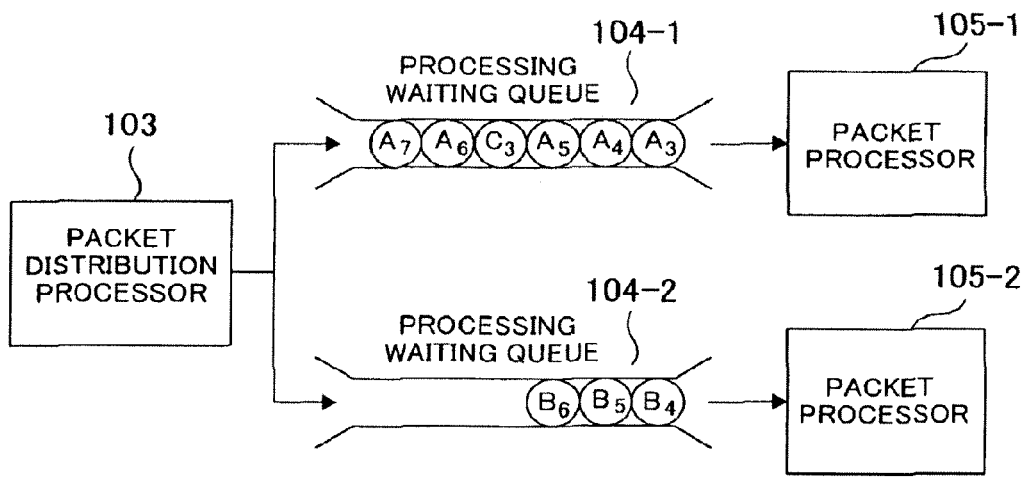
FIG. 1B is a block diagram for describing a packet distribution method using a hash method (part 2)

Modes for carrying out the present invention will hereinafter be described in detail, using an embodiment with reference to the accompanying drawings. Incidentally, like reference numerals are respectively attached to substantially the same components. Therefore, the detailed description of these components is not repeated.

A network system to which a network relay apparatus is applied will first be explained with reference to FIG. 2. Here, FIG. 2 is a hardware block diagram of the network system.

Figure 2:
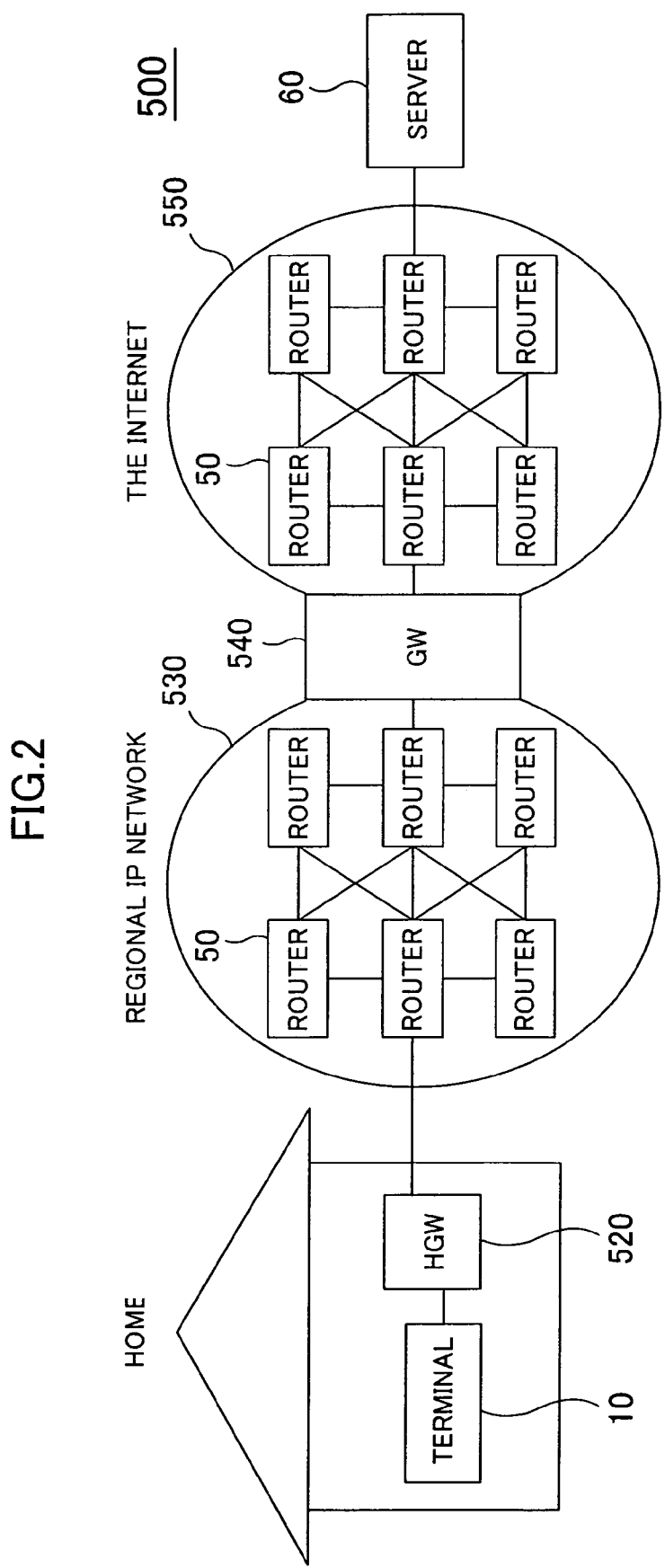
FIG. 2 is a hardware block diagram of a network system.

In FIG. 2, the network system 500 comprises a home gateway (HGW) 520 installed in a home, a regional IP network 530 connected to the HGW 520, the Internet 550, and a gateway 540 which connects the regional IP network 530 and the Internet 550. A terminal 10 is connected to the HGW 520. A server 60 is connected to the Internet 550. The regional IP network 530 and the Internet 550 are respectively comprised of routers connected in mesh form. Any of the HGW 520, GW 540 and routers 50 is a network relay apparatus.

Figure 3:
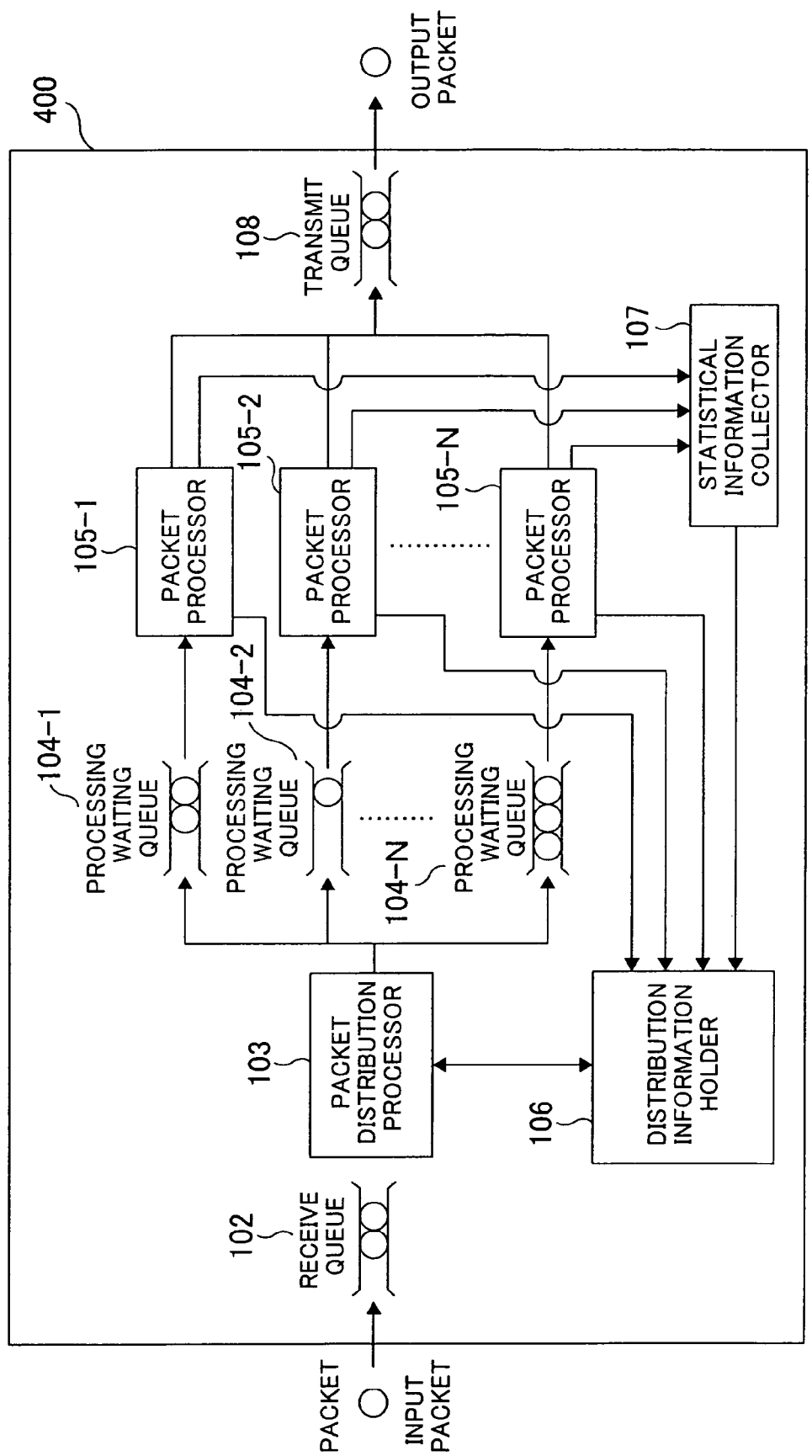
FIG. 3 is a function block diagram of a network relay apparatus.

A configuration of a network relay apparatus will be explained with reference to FIG. 3. Here, FIG. 3 is a functional block diagram of the network relay apparatus. In FIG.

3, the network relay apparatus 400 comprises a receive queue 102, a packet distribution processor 103, N numbers of processing waiting queues 104, N numbers of packet processors 105, a transmit queue 108, a statistical information collector 107 and a distribution information holder 106.

When the network relay apparatus 400 receives packets therein, the receive queue 102 temporarily holds the packets. The pack distribution processor 103 takes out one packet from the receive queue 102. The packet distribution processor 103 specifies one of packet-distribution designation packet processors 105-1 through 105-N by referring to the distribution information holder 106. The packet distribution processor 103 distributes a packet to its corresponding processing waiting queue 104 associated with the specified distribution destination packet processor 105. Incidentally, the packet distribution processor 103 specifies the corresponding distribution destination packet processor 105 by a hash operation. After the distribution of the packet to the corresponding processing waiting queue, the packet distribution processor 103 increments a reference counter for a corresponding hash value in a distribution information table 200.

Each of the packet processors 105 takes out the corresponding packet from the processing waiting queue 104. The packet processor 105 performs processes required of the network relay apparatus, such as a routing process, a protocol process, etc. The processing-completed packets are sequentially delivered and transmitted to the transmit queue 108. The packet processor 105 counts counter information indicative of a load state in accordance with the number of packets processed per unit time, and the like. Incidentally, after each of the packet processors 105 has transmitted the packet to the transmit queue 108, the packet processor 105 decrements a reference counter for the corresponding hash value in the distribution information table 200. The hash value may be recalculated by the corresponding packet processor 105. Alternatively, the packet distribution processor 103 may apply the hash value to its corresponding packet.

The statistical information collector 107 regularly collects counter information indicative of load states of the individual packet processors 105, such as the number of packet processed per unit time and counted by each of the packet processors 105. On the basis of the information, the statistical information collector 107 arranges, in light order of load, indices for specifying the packet processors 105-1 through 105-N and creates and updates a load state list 300. The distribution information holder 106 holds the distribution information table 200 and the load state list 300 therein.

The distribution information table and the load state list will be explained with reference to FIGS. 4 and 5. Here, FIG. 4 is a diagram for describing the distribution information table. FIG. 5 is a diagram for describing the load state list.

In FIG. 4, the distribution information table 200 comprises hash values 201 for specifying flows, indices 202 indicative of the packet distribution destination packet processors 105-1 through 105-N, and reference counters 203 each indicative of how many packets belonging to the flows exist in the processing waiting queue 104.

Each hash value 201 for specifying the flow is determined by performing a hash calculation on the basis of information lying in header information of each received packet. Described concretely, the hash calculation is performed by utilizing a source IP address, a destination IP address, a source port number, a destination port number and a protocol number in combination.

The index 202 of each distribution destination packet processor is referred to when a packet is received and a flow is specified, and indicates to which packet processor 105 the corresponding flow is distributed. The reference counter 203 performs addition when the packet distribution processor 103 has sent each packet to the corresponding processing waiting queue 104, and performs subtraction upon completion of the processing at each distribution destination packet processor 105.

In FIG. 5, the load state list 300 comprises a load order 301 and a packet processor index 302. In the load state list 300, the load means being light as the load order 301 descends, and the corresponding packet processor 105 is determined by its corresponding index 302.

Figure 6:
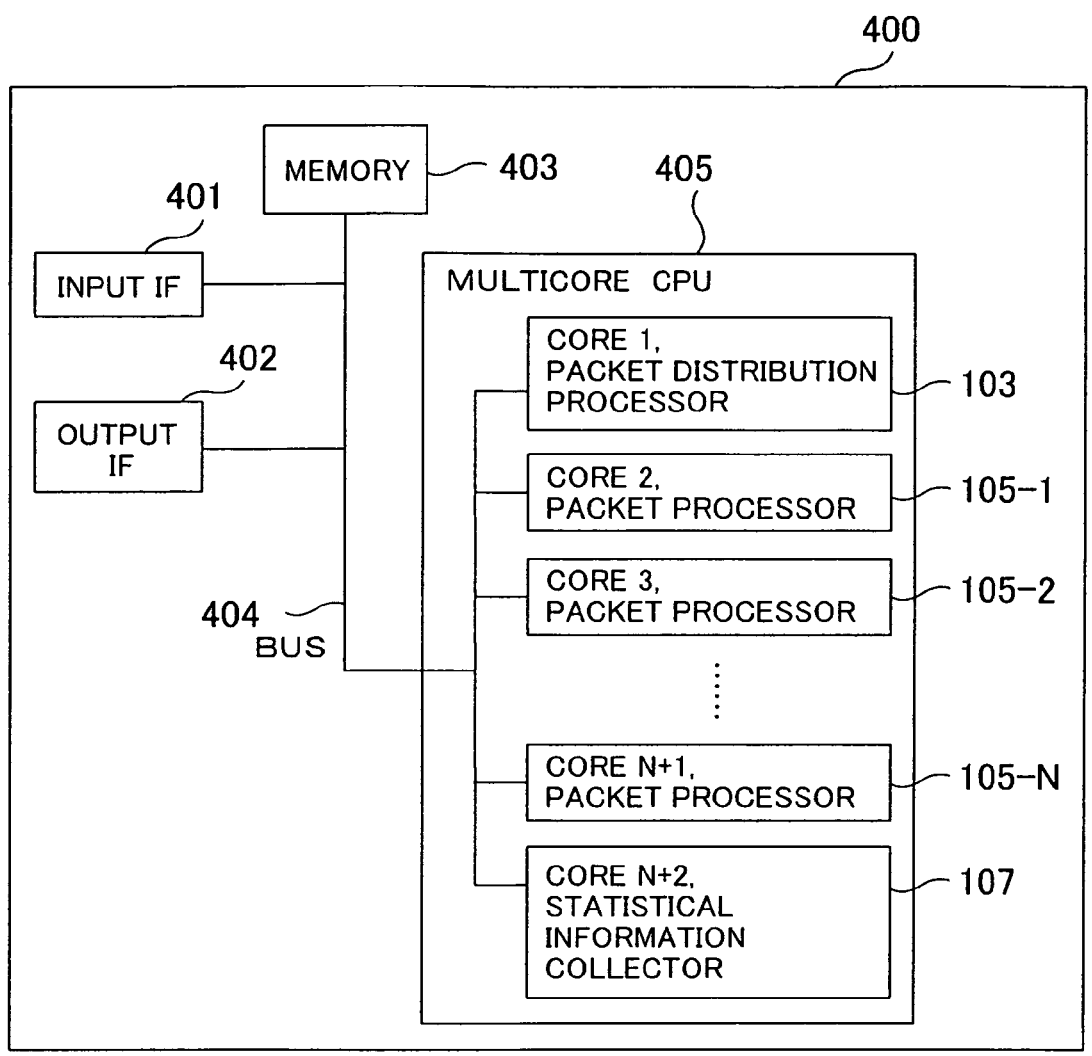
FIG. 6 is a hardware block diagram of a network relay apparatus.

A hardware configuration of the network relay apparatus will be explained with reference to FIG. 6. Here, FIG. 6 is a hardware block diagram of the network relay apparatus. In FIG. 6, the network relay apparatus 400 comprises a multi-core CPU 405, an input IF 401, an output IF 402 and a memory 403 interconnected with one another by a bus 404. Further, a core 1 of the multicore CPU 405 operates as a packet distribution processor 103. A core 2 of the multicore CPU 405 operates as a packet processor 105-1. Similarly, a core N+1 of the multicore CPU 405 operates as a packet processor 105-N. Further, a core N+2 of the multicore CPU 405 operates as a statistical information collector 107.

The input IF 401 converts a signal received from outside into signal form handled inside the apparatus and inputs it to its corresponding receive queue 102 as a packet. The output IF 402 takes out the packet from the corresponding transmit queue 108, and converts it into signal form handled by an external line and outputs it therefrom. Incidentally, although the input IF 401 and the output IF 402 shown in FIG. 6 are respectively shown as one in number, each of the number of IFs 401 and 402 may be plural.

The receive queue 102, transmit queue 108, processing waiting queues 104 and distribution information holder 106 are allocated to the memory 403.

As is apparent from a comparison between FIGS. 3 and 6, the packet distribution processor 103, packet processors 105 and statistical information collector 107 are implemented by causing the respective cores to execute programs on the memory. However, the packet distribution processor 103, the packet processors 105 and the statistical information processor 107 can also be realized by LSI as hardware, respectively.

Figure 7:
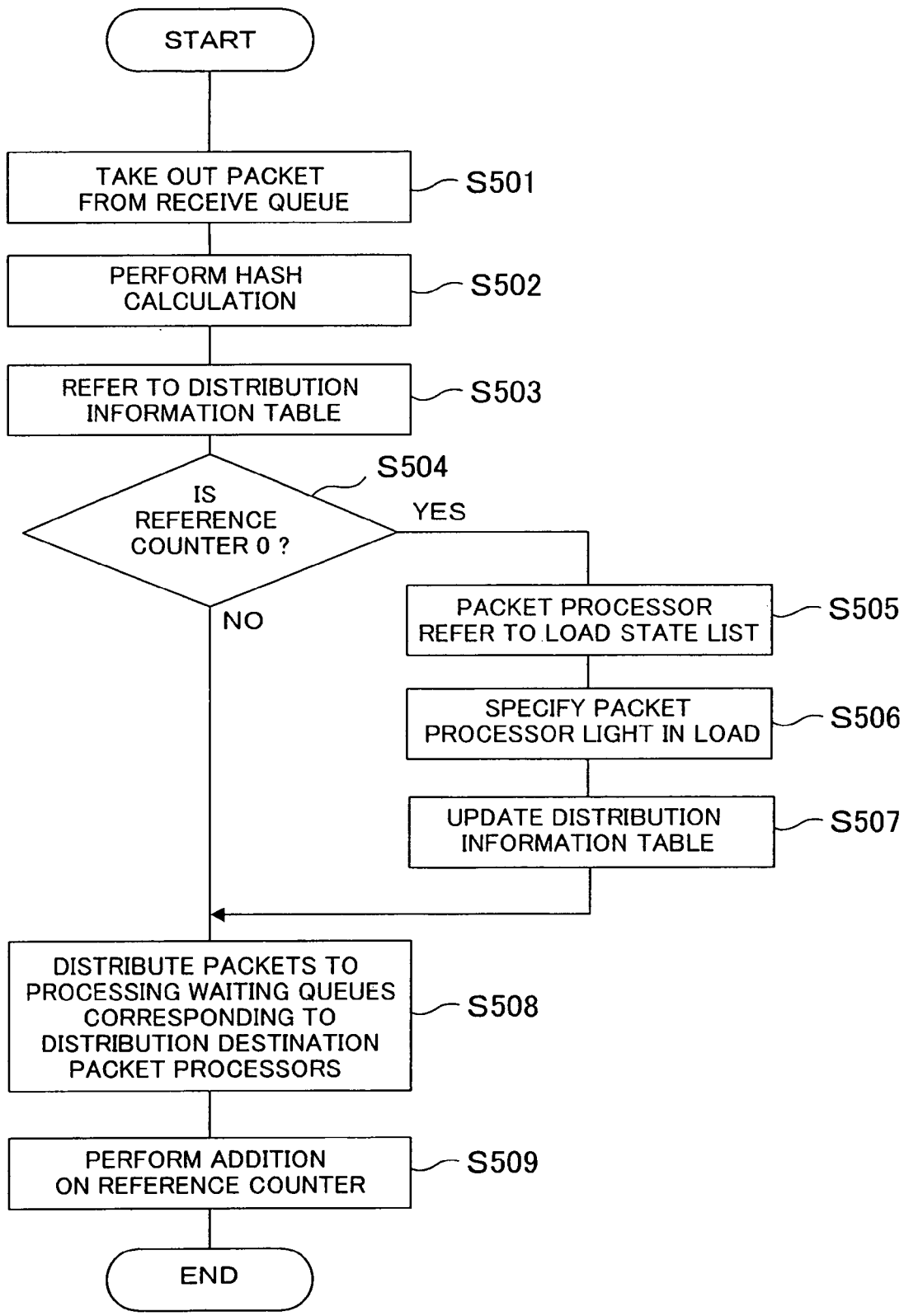
FIG. 7 is a flowchart showing the operation of a packet distribution processor.

The contents of processing of the packet distribution processor will be explained with reference to FIG. 7. Here, FIG. 7 is a flowchart showing the operation of the packet distribution processor. In FIG. 7, the packet distribution processor 103 first takes out packets from the receive queue 102 when the packets exist in the receive queue 102 (S501). The packet distribution processor 103 next performs a hash calculation, based on head information of each packet (S502) to obtain a hash value for specifying each flow. The packet distribution processor 103 refers to the distribution information table 200 based on each hash value (S503). The packet distribution processor 103 determines whether the reference counter 203 corresponding to the flow is 0 (S504). When it is found not to be zero (the answer is NO), the packet distribution processor 103 refers likewise to the distribution information table 200 and transfers or shifts the packets to the processing waiting queues 104-1 through 104-N corresponding to the distribution destination packet processors 105-1 through 105-N (S508). The packet distribution processor 103 adds the values of the reference counters 203 corresponding to the flows on the distribution information table 200 (S509) and completes the processing.

On the other hand, when the value of the reference counter is 0 at Step 504, the packet distribution processor 103 refers to the load state list 300 (S505). The packet distribution processor 103 specifies the packet processors 105-1 through 105-N light in load (S506). At this time, the packet distribution processor 103 updates distribution destinations of the corresponding flows on the distribution information table 200 in association with the indices indicative of the specified distribution destination packet processors 105-1 through 105-N (S507) and changes to Step 508. The processing done up to this step corresponds to a series of processes. The packet distribution processor 103 repeatedly performs this processing each time it receives each packet.

The contents of processing of each packet processor will be explained with reference to FIG. 8. Here, FIG. 8 is an operation flowchart of the packet processor. In FIG. 8, the packet processor 105 takes out a packet from its corresponding processing waiting queue 104 (S601). The packet processor 105 performs a packet process such as a routing process, a protocol process or the like necessary for the packet (S602). After the completion of the packet process, the packet processor 105 transfers or shifts the packet to its corresponding transmit queue 108 to output it (S603). At this time, the packet processor 105 performs subtraction on the value of the reference counter corresponding to each flow on the distribution information table 200 (S604). The processing done up to this step corresponds to a series of processes. The packet processor 105 repeatedly performs this processing each time each packet is taken out from the receive queue 102.

The contents of processing of the statistical information collector will be explained with reference to FIG. 9. Here, FIG. 9 is a flowchart showing the operation of the statistical information collector. In FIG. 9, the statistical information collector 107 first collects counter information indicative of load states being counted by the respective packet processors 105-1 through 105-N (S701). Next, the statistical information collector 107 arranges indices indicative of the packet processors 105-1 through 105-N in light order of the load states, based on the collected information and updates the load state list 300 (S702). Since the collection of the statistical information is performed on a regular basis, the statistical information collector 107 waits for elapse of a predetermined time (S703) and returns to Step 701 again. The statistical information collector 107 repeatedly performs the processing taken up to this.

Dynamic changes in packet distribution destination according to the present embodiment will be explained with reference to FIGS. 10A through 10C. Here, FIGS. 10A through 10C are block diagrams for describing a packet distribution method and diagrams for describing a distribution information table.

Figure 10A:
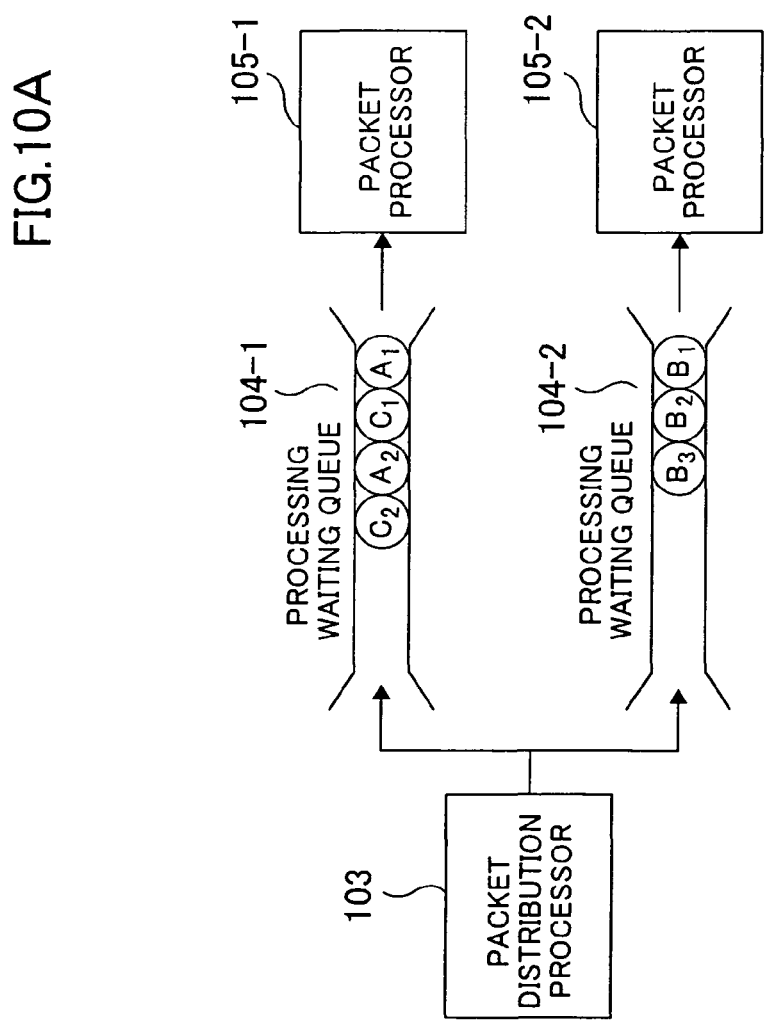
FIG. 10A is a block diagram for describing a packet distribution method and is a diagram for describing a distribution information table (part 1)

FIG. 10A represents the state in which packets are distributed in a similar manner as to that in FIG. 1A, for comparison. On the right side in the FIG. 10A, the state of a distribution information table 200 at that time is shown. For description, hash values corresponding to respective flows are defined as follows. A hash value corresponding to a flow A is assumed to be 1256, a hash value corresponding to a flow B is assumed to be 219, and a hash value corresponding to a flow C is assumed to be 2378. At this time, a distribution destination packet processor 105 corresponds to a packet processor 105-1 with respect to the flows A and B, and corresponds to a packet processor 105-2 with respect to the flow C. A reference counter is 2 for the flow A, 3 for the flow B and 2 for the flow C.

Figure 10B:
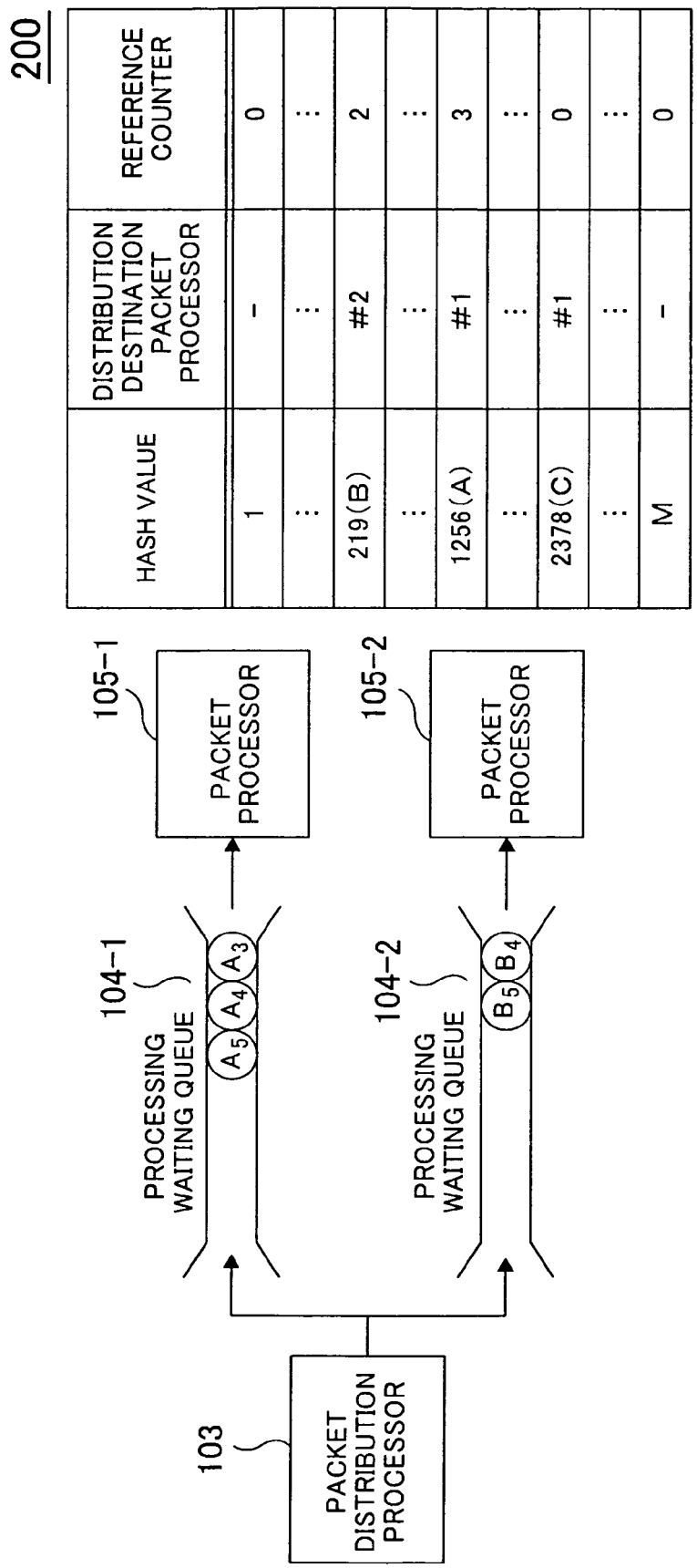
FIG. 10B is a block diagram for describing a packet distribution method and is a diagram for describing a distribution information table (part 2)
Figure 10C:
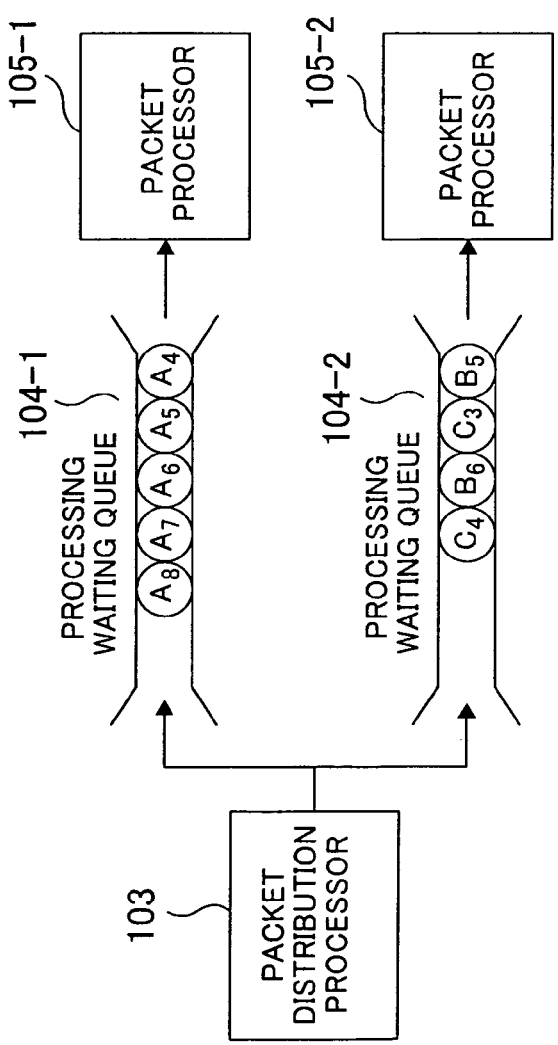
FIG. 10C is a block diagram for describing a packet distribution method and is a diagram for describing a distribution information table (part 3)

FIG. 10B shows a state of the reference counter for the flow C being 0, which is taken as the opportunity to transfer a flow to another packet processor 105. A packet for the flow C is eliminated from a processing waiting queue 104-1, and a reference counter on a distribution information table 200 also indicates 0 in conjunction with it.

When the packet for the flow C is next received in this state, a packet distribution destination is shifted on the basis of the load state list 300. Here, the load on a packet processor 105-2 is lighter than that on a packet processor 105-1. Thus, a flow distribution destination is shifted in such a manner that the flow C is processed by the packet processor 105-2. FIG. 10C shows the state in which the traffic of a flow A has increased. Since, however, the distribution destination for the flow C has already been shifted to the packet processor 105-2, the corresponding packet can be processed without being affected by the flow A.

Changing the packet distribution destinations in this way makes it possible to effectively utilize the packet processors 105 provided in plural form. Parallelizing the packet processes enables an improvement in packet transfer process.

Figure 11:
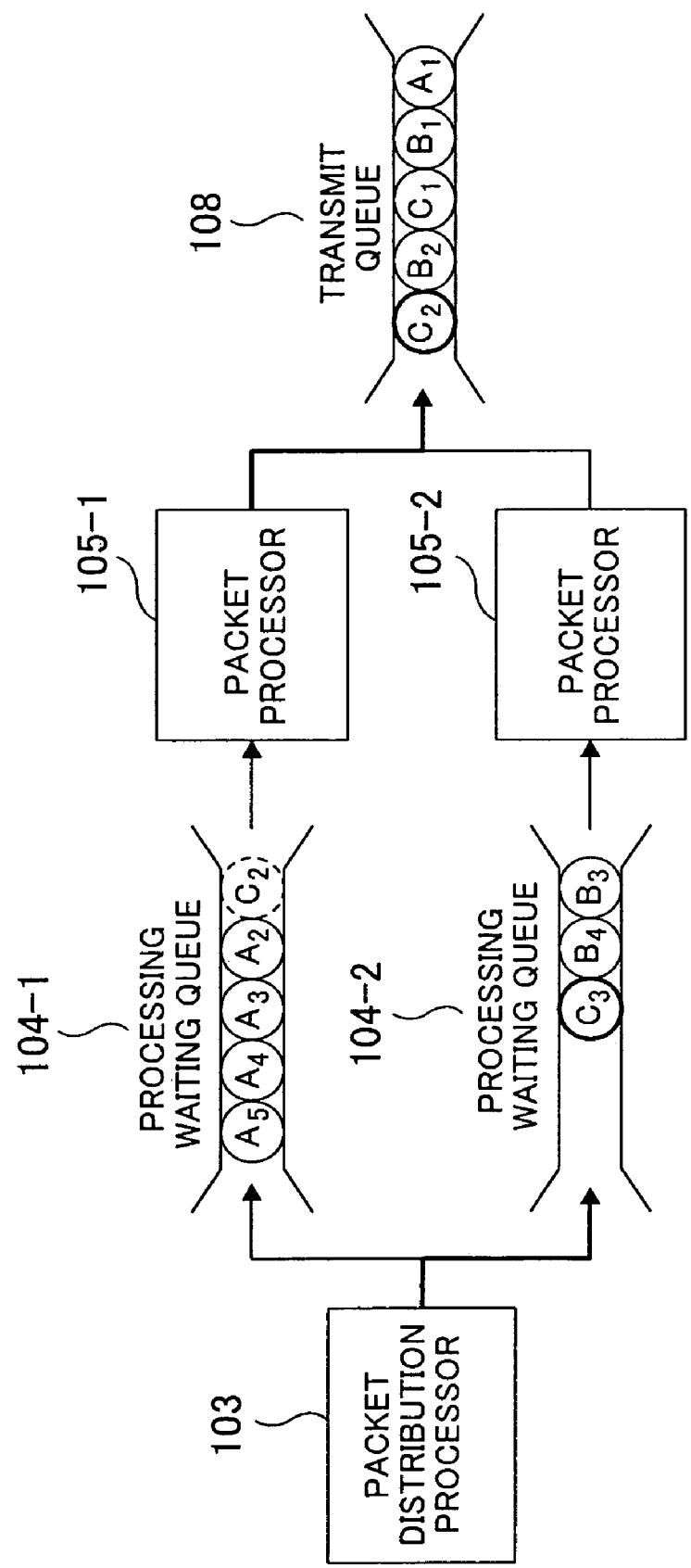
FIG. 11 is a block diagram for describing the order in which packets are transmitted.

A description will be made, with reference to FIG. 11, of a case where the reversal of order of packets in flows does not occur even when the distribution destination is changed. Here, FIG. 11 is a block diagram for describing the transmitting order of packets. A description will be made of a case where the number of packet processors 105 is limited to two in FIG. 11 in a similar manner as to the case shown in FIG. 10. The number of flows to be handled is assumed to be three of flows A, B and C. A transmit queue 108 is, however, also illustrated in addition to FIG. 10.

In FIG. 11, the flows A and C are first placed in a processing waiting queue 104-1 so as to be processed by a packet processor 105-1. The flow B is placed in a processing waiting queue 104-2. Assume that in this state, a packet C2 is transferred from the processing waiting queue 104-1 to the packet processor 105-1, where it is subjected to packet processing, followed by being placed in a transmit queue 108.

At this time, a reference counter for the flow C becomes 0. In this case, a packet for the flow C does not exist in any of the processing waiting queues 104 and the packet processors 105. When the packet for the flow C is received again in the state of the reference counter being 0, no reversal of order occurs even if the packet processing is done by any packet processor 105. This is because since the same flows are not processed in parallel in parallel processing sections of the processing waiting queues 104-1 and 104-2 and packet processors 105-1 and 105-2, it is assured that the reverse of order by packet overtaking does not occur.

Paying attention to only one flow, this case is the same as that in which one flow is performed order processing by one packet processor 105. Thus, if the reference counter is in the state of 0, then the distribution destination can be transferred from the packet processor 105-1 to the packet processor 105-2 without causing the reversal of order.

The network relay apparatus according to the present embodiment is useful in the case where a relay apparatus on a network that handles many flows of plural types needs higher-speed transfer processing. According to the present embodiment, the packet relay apparatus can dynamically change the distribution destination of each packet for every flow according to actual traffic situations. Thus, even when a deviation occurs in the load depending on a variation in traffic, a plurality of packet processors can be effectively utilized by dynamically changing the distribution destinations of packets. The advantage of enhancing packet throughput is therefore brought about over the whole apparatus. Using the packet distribution method according to the present embodiment makes it possible to assure the prevention of occurrence of the reversal of packet order within flows without the need for such a packet rearrangement processor in which sequence numbers are given thereinside and packets are rearranged at an output stage.

What is claimed is:

1. A network relay apparatus comprising a receive queue, a packet distribution processor for taking out packets from the receive queue, a plurality of processing waiting queues, a plurality of packet processors corresponding to the processing waiting queues, and a transmit queue, the network relay apparatus further comprising:
   a statistical information collector for regularly collecting load states of the plurality of packet processors; and
   a distribution information holder for holding the load states collected by the statistical information collector and a distribution information table in which hash values, packet processors and counters are associated with one another;
   wherein after the packet distribution processor has transmitted a packet to one of the processing waiting queues, the packet distribution processor increments a counter associated with a hash value corresponding to the packet transmitted by the packet distribution processor, in the distribution information table,
   wherein after each of the packet processors has transmitted a packet stored in one of the processing waiting queues to the transmit queue, the packet processor decrements a counter associated with a hash value corresponding to the packet transmitted by the packet processor, in the distribution information table, and
   wherein, when a packet is acquired from the receive queue, the packet distribution processor refers to a counter associated with a hash value corresponding to the acquired packet in the distribution information table, and when the value of the referred counter is 0, the packet distribution processor specifies a packet processor having a light load and switches a packet processor currently associated with the hash value corresponding to the acquired packet, in the distribution information table to the specified packet processor.

2. A network relay apparatus comprising:
   a packet distribution processor for distributing input packets, based on hash values to thereby achieve load dispersion of packet processing;
   a statistical information collector for regularly collecting load states of respective packet processors used to specify packet distribution destinations;
   a distribution information holder for managing information for specifying the packet distribution destinations upon distribution of the packets; and
   a plurality of the packet processors for processing the distributed packets;
   wherein the distribution information holder has a distribution information table in which hash values, packet processors and counters are associated with one another,
   wherein after completion of the packet processing, the packet distribution processor increments a counter associated with a hash value corresponding to a packet processed by the packet distribution processor, in the distribution information table,
   wherein after completion of the packet processing, each of the packet processors decrements a counter associated with a hash value corresponding to a packet processed by the packet processor, in the distribution information table, and
   wherein, when the packet distribution processor acquires a packet from a receive queue, the packet distribution processor refers to a counter associated with a hash value corresponding to the acquired packet, in the distribution information table, and when the value of the referred counter is 0, the packet distribution processor specifies a packet processor having a light load and switches a packet processor currently associated with the hash value corresponding to the acquired packet, in the distribution information table to the specified packet processor.

3. A packet distribution method comprising the steps of:
   taking out each packet from a receive queue;
   collecting load states of a plurality of packet processors for processing the packet;
   calculating a hash value of the packet;
   referring to a distribution information table, based on the hash value;
   confirming whether a counter value of the distribution information table is 0;
   in case where the counter value is 0, specifying a packet processor having a light load;
   distributing the packet to a processing waiting queue of the specified packet processor;
   incrementing the counter value;
   taking out the packet from the processing waiting queue;
   outputting the packet; and
   decrementing the counter value.

4. The packet distribution method according to claim 3, wherein the load states depend on the number of processes per unit time by packet processors.

5. The network relay apparatus according to claim 1, wherein the statistical information collector collects the load states depending on numbers of processes per unit time.

* * * * *